United States Patent
Schukar et al.

(10) Patent No.: US 6,740,131 B2
(45) Date of Patent: May 25, 2004

(54) APPARATUS FOR AUTOMATICALLY FABRICATING FUEL CELL

(75) Inventors: Gary William Schukar, North Oaks, MN (US); John Russell Mlinar, Coon Rapids, MN (US); Mark Hyland Smith, Stillwater, MN (US); Steven Mark Spicer, Cottage Grove, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 202 days.

(21) Appl. No.: 10/115,537

(22) Filed: Apr. 3, 2002

(65) Prior Publication Data

US 2003/0190521 A1 Oct. 9, 2003

(51) Int. Cl.[7] .................................................. H01M 6/00
(52) U.S. Cl. ..................... 29/623.1; 29/623.3; 29/730; 29/731; 29/411; 270/30.08; 270/52.09
(58) Field of Search .............................. 29/623.1, 623.3, 29/729, 722, 730, 731, 411, 428, 592.1; 270/30.08, 52.09; 429/178, 176; 493/340

(56) References Cited

U.S. PATENT DOCUMENTS

| | | |
|---|---|---|
| 2,710,234 A | 6/1955 | Hansen |
| 3,178,041 A | 4/1965 | Wheat et al. |
| 3,285,112 A | 11/1966 | Dale et al. |
| 3,359,046 A | 12/1967 | Dryden |

(List continued on next page.)

FOREIGN PATENT DOCUMENTS

| | | |
|---|---|---|
| AT | 314 323 B | 3/1974 |
| BE | 1007774 A3 | 10/1995 |
| DE | 19 28 110 A | 12/1970 |
| DE | 26 10 628 A | 9/1977 |
| DE | 33 43 811 A | 6/1985 |

(List continued on next page.)

OTHER PUBLICATIONS

U.S. patent application Ser. No. 10/446,485, Roll–Good Fuel Cell Fabrication Processes, Equipment, and Articles Produced from Same, filed May 28, 2003.

(List continued on next page.)

*Primary Examiner*—Carl J. Arbes
*Assistant Examiner*—Tim Phan
(74) *Attorney, Agent, or Firm*—Mark A. Hollingsworth; Philip Y. Dahl

(57) ABSTRACT

An apparatus and method provide for automated converting of a web of a thin patterned catalyst-coated membrane to separate membrane sheets for fuel cell assembly. The membrane typically has a thickness of about one thousandth of an inch. Automated web converting involves transporting, with use of a movable vacuum, an end portion of the membrane web from a first location to a second location. With use of respective first and second vacuums at the first and second locations, and after removal of the movable vacuum, the end portion of the membrane web is releasably secured at the first and second locations. The membrane web is cut within a gap defined between a single catalyst pattern of the membrane web end portion and an adjacent catalyst pattern to produce a membrane sheet. The membrane sheet is precisely positioned to a desired orientation to facilitate subsequent processing of the membrane sheet.

18 Claims, 5 Drawing Sheets

U.S. PATENT DOCUMENTS

| | | | |
|---|---|---|---|
| 3,380,788 A | | 4/1968 | Wilcock |
| 3,477,558 A | | 11/1969 | Fleischauer |
| 3,861,259 A | | 1/1975 | Hitch |
| 3,946,920 A | | 3/1976 | Jordan et al. |
| 4,143,871 A | | 3/1979 | Blessing |
| 4,168,772 A | | 9/1979 | Eberle |
| 4,236,814 A | | 12/1980 | Tonkin |
| 4,286,467 A | | 9/1981 | Kober |
| 4,360,260 A | | 11/1982 | Eloranta et al. |
| 4,381,596 A | | 5/1983 | Simonton et al. |
| 4,534,549 A | | 8/1985 | Eberle |
| 4,591,139 A | | 5/1986 | Engelbart |
| 4,676,862 A | | 6/1987 | Kuchnert |
| 4,728,093 A | | 3/1988 | Eberle |
| 4,784,380 A | | 11/1988 | Eberle |
| 4,819,928 A | | 4/1989 | Osborn et al. |
| 4,887,858 A | | 12/1989 | Gazzarrini |
| 5,031,002 A | | 7/1991 | Yaguchi |
| 5,048,182 A | | 9/1991 | Robbins, III |
| 5,061,337 A | | 10/1991 | Fraser |
| 5,063,415 A | | 11/1991 | Ariyama |
| 5,078,375 A | | 1/1992 | Steidinger |
| 5,133,543 A | | 7/1992 | Eitel et al. |
| 5,383,270 A | * | 1/1995 | Iwatsuka et al. ............... 29/840 |
| 5,443,602 A | * | 8/1995 | Kejha .......................... 29/730 |
| 5,456,871 A | | 10/1995 | Harada et al. |
| 5,556,499 A | | 9/1996 | Clough |
| 5,596,897 A | | 1/1997 | Payne, Jr. et al. |
| 5,761,793 A | | 6/1998 | Bevers et al. |
| 5,762,753 A | | 6/1998 | Clough |
| 5,783,024 A | | 7/1998 | Forkert |
| 5,791,185 A | | 8/1998 | Bodnar |
| 5,989,747 A | | 11/1999 | Tanaka et al. |
| 6,007,660 A | | 12/1999 | Forkert |
| 6,059,003 A | | 5/2000 | Wittkopf |
| 6,066,409 A | | 5/2000 | Ronne et al. |
| 6,159,327 A | | 12/2000 | Forkert |
| 6,224,203 B1 | | 5/2001 | Wotton et al. |
| 6,241,839 B1 | | 6/2001 | Yoshino et al. |
| 6,326,097 B1 | * | 12/2001 | Hockaday .................... 439/34 |
| 6,347,585 B1 | | 2/2002 | Kiamco et al. |
| 6,405,779 B1 | | 6/2002 | Wittkopf |
| 6,419,217 B1 | | 7/2002 | Hartmann et al. |
| 6,500,217 B1 | | 12/2002 | Starz et al. |
| 2002/0014509 A1 | | 2/2002 | Kitai et al. |
| 2002/0134501 A1 | | 9/2002 | Fan et al. |
| 2002/0136940 A1 | | 9/2002 | Mao et al. |

FOREIGN PATENT DOCUMENTS

| | | |
|---|---|---|
| DE | 94 00 890.6 U1 | 3/1994 |
| DE | 195 48 422 A1 | 9/1997 |
| EP | 0 654 347 a1 | 11/1994 |
| EP | 1 037 295 A1 | 9/2000 |
| FR | 2 456 613 A | 12/1980 |
| GB | 1 084 597 A | 9/1967 |
| GB | 2101098 A | 1/1983 |
| JP | 55-98040 | 7/1980 |
| JP | 57-93854 | 6/1982 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |
| WO | WO 02/43171 A2 | 5/2002 |
| WO | WO 02/43179 A1 | 5/2002 |

OTHER PUBLICATIONS

U.S. patent application Ser. No. 10/115,516, Mlinar et al., filed Apr. 3, 2002, co–pending application.

U.S. patent application Ser. No. 10/115,733, Mlinar, filed Apr. 3, 2002, co–pending application.

U.S. patent application Ser. No. 10/115,556, Eaton et al., filed Apr. 3, 2002, co–pending application.

U.S. patent application Ser. No. 10/115,513, Behymer, filed Apr. 3, 2002, co–pending application.

U.S. patent application Ser. No. 10/115,778, Hirsch, filed Apr. 3, 2002.

U.S. patent application Ser. No. 10/115,777, Ripley, filed Apr. 3, 2002.

U.S. patent application Ser. No. 10/116,323, Ripley, filed Apr. 3, 2002.

U.S. patent application Ser. No. 10/115,523, Ripley et al., filed Apr. 3, 2002.

U.S. patent application Ser. No. 10/115,731, Mlinar, filed Apr. 3, 2002.

* cited by examiner

APPARATUS FOR AUTOMATICALLY FABRICATING FUEL CELL

FIELD OF THE INVENTION

The present invention relates generally to automated fuel cell fabrication and, more particularly, to an apparatus and method for converting a web of a fuel cell membrane to separate membrane sheets and accurately positioning the separated membrane sheets for subsequent processing.

BACKGROUND OF THE INVENTION

Various apparatuses have been developed to convert a web of a given material to individual sheets. Converting extremely thin web structures on the order of a thousandth of an inch thick renders conventional converting processes generally unworkable for such applications. One particular structure of interest in the construction of fuel cells is the thin membrane of the fuel cell. An apparatus for converting a membrane web must be capable of handling and cutting very thin, two-sided membrane structures of the web and, once cut, properly aligning the membrane sheets for downstream processing. Disrupting the positioning of the membrane sheets at a particular process station can result in damage to the membrane sheets or the fuel cell structures that incorporate such membrane sheets. Disturbing membrane sheet orientation is also likely to result in reduced product throughput, which negatively affects the productivity of the automated fuel cell assembly line.

It is often desirable to automate, either partially or completely, a number of web converting processes. Many conventional web converting apparatuses and methods are not well suited for a high degree of automation, particularly converting processes which have tight positional tolerance requirements.

There is a need for improved web converting apparatuses and methodologies. There is a further need for such apparatuses and methodologies that can safely and precisely convert a web of very thin web structures to individual sheets in an automated assembly environment, such as in an automated fuel cell assembly plant. The present invention fulfills these and other needs.

SUMMARY OF THE INVENTION

The present invention is directed to an apparatus and method for automatically converting a web of a thin patterned catalyst-coated membrane to separate membrane sheets for fuel cell assembly. A first side of the membrane web is coated with an anode catalyst and a second side of the membrane web is coated with a cathode catalyst. The membrane is typically less than about two thousandths of an inch in thickness, and typically has a thickness of about one thousandths of an inch.

An automated web converting method involves transporting, with use of a movable vacuum, an end portion of the membrane web from a first location to a second location. With use of respective first and second vacuums at the first and second locations, and after removal of the movable vacuum, the end portion of the membrane web is releasably secured at the first and second locations. The membrane web is cut within a gap defined between a single catalyst pattern of the membrane web end portion and an adjacent catalyst pattern to produce a membrane sheet. The membrane sheet is precisely positioned to a desired orientation to facilitate subsequent processing of the membrane sheet.

An apparatus for automatically converting a web of a thin patterned catalyst-coated membrane to separate membrane sheets for fuel cell assembly includes a staging station comprising a first vacuum and a gap detector. The gap detector detects a gap between catalyst patterns of the membrane web. The staging station receives the end portion of the membrane web. A positioning station includes a positioning table and a second vacuum. The positioning table is controllable to move axially and rotationally. A vision system is provided at the positioning station. The vision system detects an orientation of a membrane sheet cut from the membrane web with use of a cutter. A robot, comprising a vacuum chuck, is moveable between at least the staging station and the positioning station.

A controller is programmed to cause the robot to transport, with use of a vacuum at the vacuum chuck, the end portion of the membrane web from the staging station to the positioning table, to selectively actuate and deactivate the first and second vacuums and the vacuum chuck vacuum when causing the cutter to cut the membrane web within the gap between catalyst patterns, and to control movement of the positioning table so that the membrane sheet is moved to a desired orientation to facilitate subsequent processing of the membrane sheet.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
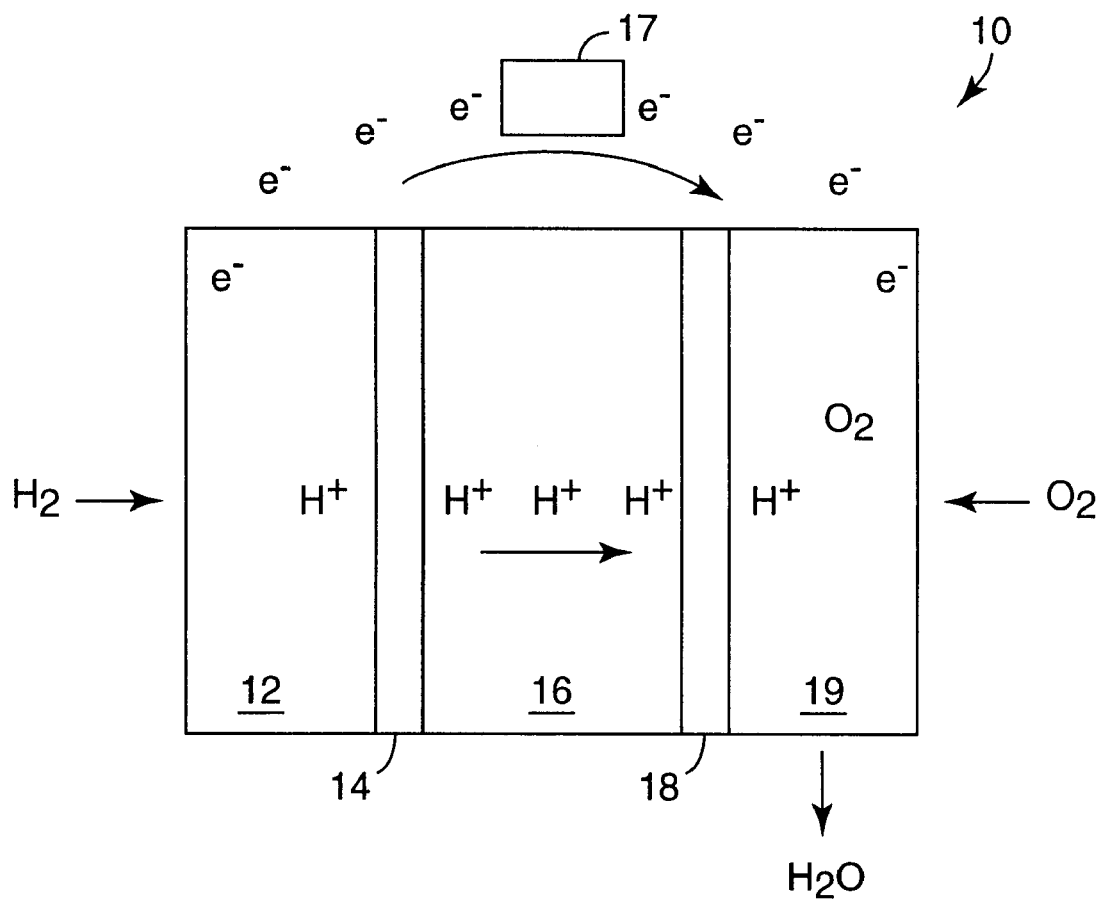
FIG. 1 is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

An apparatus for converting a web of a fuel cell membrane to separate membrane sheets according to the present invention represents an important apparatus used to automate a fuel cell assembly process. A web converting apparatus and method of the present invention provides for the continuous converting of a thin fuel cell membrane web to individual membrane sheets, and precise positioning of individual membrane sheets as needed by downstream process stations. A web converting apparatus and method of the present invention is particularly useful for converting webs having very thin patterned regions (e.g., fuel cell membranes), where the patterned regions are typically less than about three thousandths of an inch in thickness, and typically about one thousandth of an inch in thickness.

Those skilled in the art will readily appreciate the difficulty of converting web structures on the order of a thousandth of an inch thick to separate sheets of such structures. One particular structure of interest in the construction of fuel cells is the membrane of the fuel cell. As will be described in greater detail below, the membrane of a fuel cell, according to certain technologies, is typically a three layered structure. A typical fuel cell membrane includes a proton exchange membrane. An anode catalyst is coated on one side of the proton exchange membrane, and a cathode catalyst is coated on the other side of the proton exchange membrane. The three layered structure is typically about one thousandth of an inch in thickness.

In order to facilitate automated assembly of fuel cells, the membrane web converting process must be able to handle and cut the thin, two-sided membrane structures of the web and, once cut, precisely position the membrane sheets so that the sheets are in proper alignment when transported for subsequent processing at a downstream process station. It can be appreciated that maintaining a predetermined orientation of the membrane sheets at each process station of an automated fuel cell assembly line is essential if processing of the membrane sheets and fuel cell structures incorporating such membrane sheets is to be achieved with high efficiency and accuracy. Disrupting the positioning of the membrane sheets at a particular process station can result in damage to the membrane sheets or the fuel cell structures that incorporate such membrane sheets. Also, throughput at a particular downstream process station will likely be reduced, which negatively affects the productivity of the automated fuel cell assembly line.

A catalyst-coated membranes (CCM) web is a thin, delicate continuous polymer sheet. The catalyst is applied in a specific pattern at a repeating pitch. One skilled in the art will appreciate that very thin fuel cell membrane structures, such as CCMs, have very little structural integrity. This lack of structural integrity significantly complicates the web handling and processing considerations for automated fuel cell assembly. For example, traditional methods of locating rigid edges of the subject structures are not workable. Conventional approaches involving the use of registration holes, by way of further example, are also not workable. A web converting apparatus and method of the present invention provides for safe handling, cutting, and positioning of fuel cell membrane sheets converted from a continuous membrane web.

A web converting apparatus and method of the present invention may be used to process membrane webs for a variety of fuel cell technologies. A typical fuel cell is depicted in FIG. 1. The fuel cell 10 shown in FIG. 1 includes a first fluid transport layer 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A web converting apparatus of the present invention can be employed to facilitate automated converting of membrane webs for fuel cells of varying technologies. Proton exchange membrane (PEM) fuel cells, for example, operate at relatively low temperatures (about 175 degrees F.), have high power density, can vary their output quickly to meet shifts in power demand, and are well suited for applications where quick startup is required, such as in automobiles for example.

The proton exchange membrane used in a PEM fuel cell is a thin plastic sheet that allows hydrogen ions to pass through it. The membrane is coated on both sides with highly dispersed metal or metal alloy particles (e.g., platinum or platinum/ruthenium) that are active catalysts. The electrolyte used is typically a solid organic polymer polyperfluorosulfonic acid. Use of a solid electrolyte is advantageous because it reduces corrosion and management problems.

Hydrogen is fed to the anode side of the fuel cell where the catalyst encourages the hydrogen ions to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

According to one PEM fuel cell construction, a PEM layer is sandwiched between a pair of fluid transport layers (FTLs), such as diffuse current collectors or gas diffusion layers for example. An anode is situated between a first FTL and the membrane, and a cathode is situated between the membrane and a second FTL. In one configuration, a PEM layer is fabricated to include an anode catalyst coating on one surface and a cathode catalyst coating on the other surface. According to another configuration, the first and second FTLs are fabricated to include an anode and cathode catalyst coating, respectively. In yet another configuration, an anode catalyst coating can be disposed partially on the first FTL and partially on one surface of the PEM, and a cathode catalyst coating can be disposed partially on the second FTL and partially on the other surface of the PEM. The five layer construct defined by the first FTL/anode/PEM/cathode/second FTL is referred to as a membrane electrode assembly (MEA).

The FTLs are typically fabricated from a carbon fiber paper or non-woven material. Depending on the product construction, the FTLs can have carbon particle coatings on one side. The FTLs, as discussed above, can be fabricated to include or exclude a catalyst coating. The FTLs, according to this product construction, are both porous and brittle.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190 degrees F.

Molten carbonate fuel cells (MCFC) use a liquid solution of lithium, sodium and/or potassium carbonates, soaked in a matrix for an electrolyte. MCFCs operate at about 1,200 degrees F. The high operating temperature is needed to achieve sufficient conductivity of the electrolyte. Because of this high temperature, noble metal catalysts are not required for the cell's electrochemical oxidation and reduction processes. MCFCs are typically operated on hydrogen, carbon monoxide, natural gas, propane, landfill gas, marine diesel, and simulated coal gasification products.

A solid oxide fuel cell (SOFC) typically employs a hard ceramic material of solid zirconium oxide and a small amount of ytrria, instead of a liquid electrolyte, allowing operating temperatures to reach 1,800 degrees F.

In regenerative fuel cells, water is separated into hydrogen and oxygen by a solar-powered electrolyser. The hydrogen and oxygen are fed into the regenerative fuel cell which generates electricity, heat, and water. The water is then recirculated back to the solar-powered electrolyser and the process is repeated.

A protonic ceramic fuel cell (PCFC) employs a ceramic electrolyte material that exhibits high protonic conductivity at elevated temperatures. PCFCs operate at about 1,300 degrees F. PCFCs can operate at high temperatures and electrochemically oxidize fossil fuels directly to the anode. Gaseous molecules of the hydrocarbon fuel are absorbed on the surface of the anode in the presence of water vapor, and hydrogen ions are efficiently stripped off to be absorbed into the electrolyte, with carbon dioxide as the primary reaction product. These and other fuel cell technologies can be fabricated with use of a web converting apparatus of the present invention.

Figure 2:
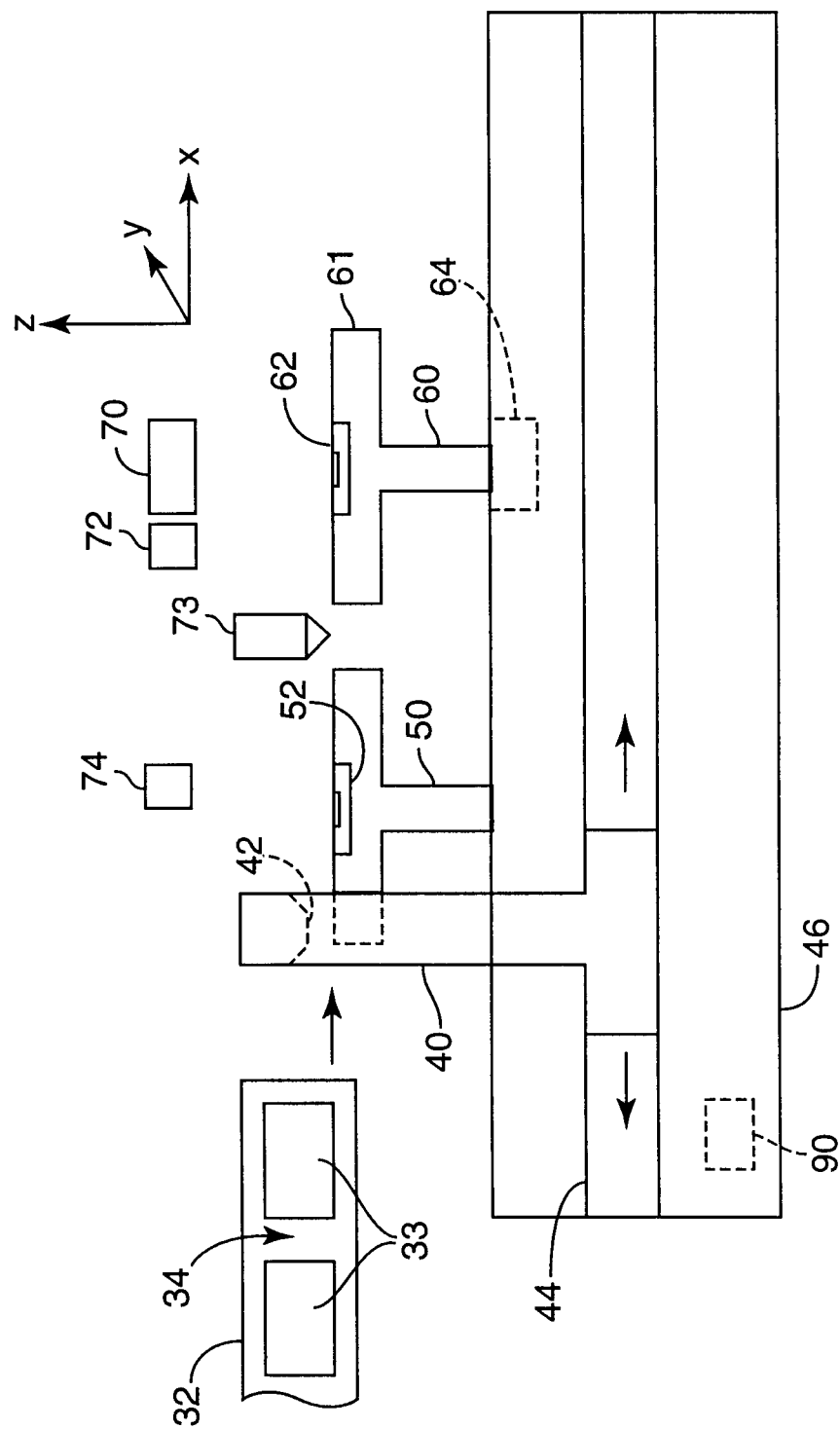
FIG. 2 is a depiction of an apparatus for converting a web of a fuel cell membrane to individual membrane sheets in accordance with an embodiment of the present invention.
Figure 3:
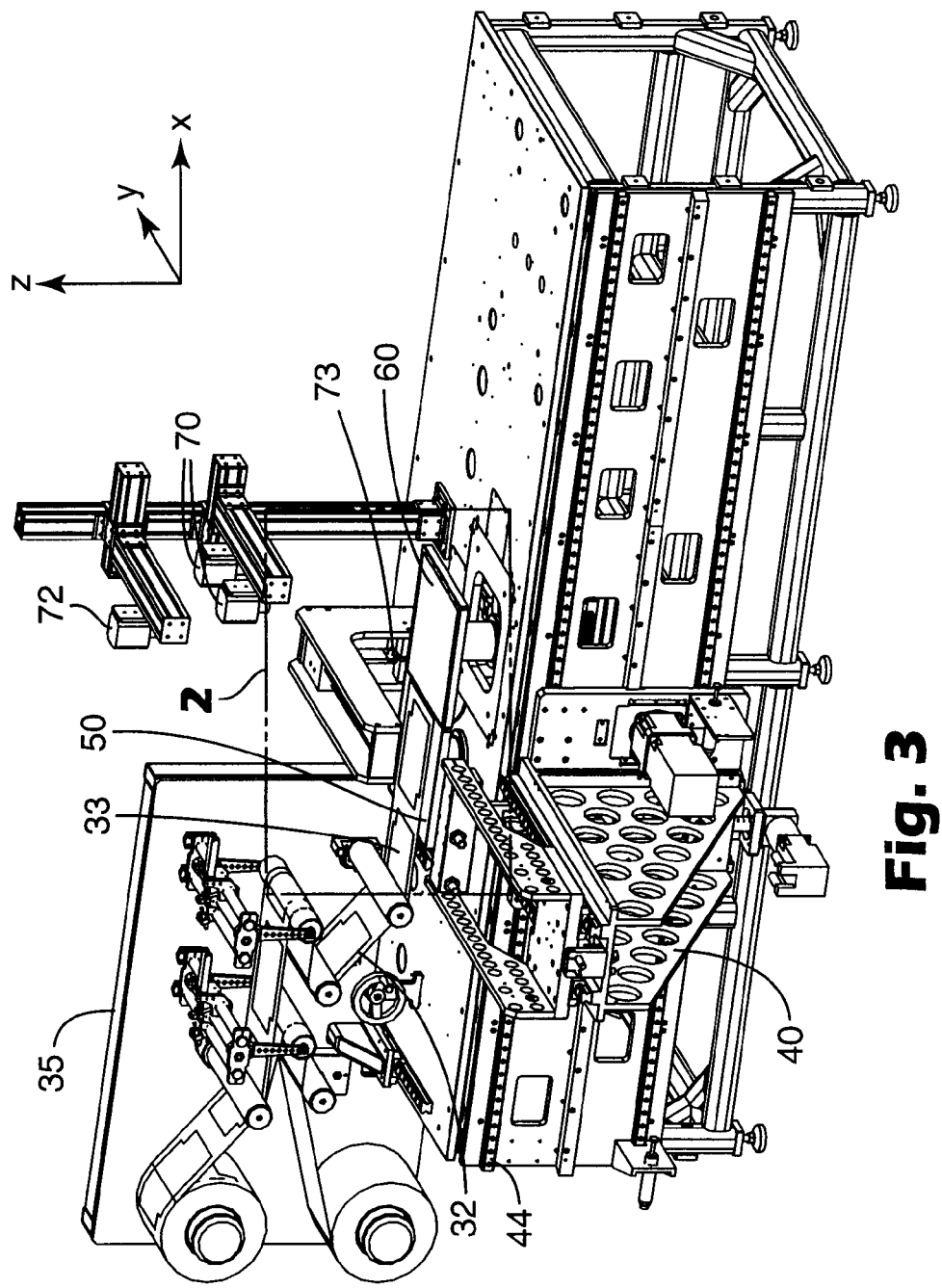
FIG. 3 is an embodiment of an apparatus for converting a web of a fuel cell membrane to individual membrane sheets in accordance with the present invention.

Turning now to FIG. 2, there is depicted an embodiment of a web converting apparatus 30 for converting a web of a fuel cell membrane to individual fuel cell membrane sheets and positioning such membrane sheets to a predetermined orientation for processing at a subsequent process station. The web converting apparatus 30 is particularly well suited for converting a web 32 of a patterned catalyst-coated membrane 33 to separate membrane sheets during automated fuel cell assembly. According to this non-limiting usage, a first side of the membrane web 32 is coated with an anode catalyst and a second side of the membrane web 32 is coated with a cathode catalyst. A web handling module (not shown in FIG. 2, but shown in FIG. 3) presents an end portion of the membrane web 32 to the web converting apparatus 30.

The web converting apparatus 30 shown in FIG. 2 includes a staging station 50 which includes a first vacuum assembly (not shown) fluidly coupled to a vacuum distribution plate 52 of the staging station 50. The top surface of the staging station 50 is preferably perforated horizontally (i.e., along the x-axis in FIG. 2) to define the vacuum distribution plate 52. The vacuum assembly is selectively actuated during web processing by a controller 90. Controller 90 is a programmable device, such as a processor, that executes program instructions to coordinate the activities of various elements of the web converting apparatus 30. The controller 90 is shown as an on-board device, but may be located remotely of the web converting apparatus 30. If located remotely, the controller 90 is coupled to the web converting apparatus 30 using an appropriate hardwired or wireless connection.

Proximate a staging station 50 is a gap detector 74. The gap detector 74 can be mounted on or above the staging station 50. The gap detector 74 is situated in such as way as to be capable of detecting the gap 34 provided between adjacent membrane patterns 33 of the web 32. According to one configuration, the gap detector 74 comprises an optical detector that optically detects advancement of a single catalyst pattern 33 of the membrane web 32 across the staging station 50. In one particular configuration, the gap detector 34 comprises a photo-eye that detects advancement of a single catalyst pattern 33 of the membrane web 32 across the staging station 50.

A cutter 73 is situated proximate the staging station 50, and typically above the staging station 50. The cutter 73 is preferably situated parallel to a space provided between the staging station 50 and the positioning station 60. The cutter 73 is preferably mounted for movement transverse of the movement of web 32. The cutter 73 is displaceable axially along the y-axis depicted in FIG. 2. In this configuration, the cutter 73 moves transversely to cut through the web 32 within the gap 34 provided between adjacent membrane patterns 33. Movement of the cutter 73 is controlled by the controller 90.

The positioning station 60, which is shown located adjacent to the staging station 50, includes a positioning table 61 and a second vacuum assembly (not shown) fluidly coupled to a vacuum distribution plate 62 of the positioning station 60. The top surface of the positioning station 60 is preferably perforated horizontally to define the vacuum distribution plate 62. The vacuum assembly of the positioning station 60 is selectively actuated during web processing by the controller 90.

The positioning table 61 is mounted for movement with multiple degrees of freedom. In particular, the positioning table 61 can be moved axially with respect to an x-axis and a y-axis, and rotationally about a z-axis. Movement of the positioning table 61 is precisely controlled by the controller 90. In one configuration, a servomotor drive system 64 is employed for moving the positioning table 61 axially with respect to the x-axis and y-axis, and rotationally about a z-axis.

The positioning table 61, under control of the controller 90, cooperates with a vision system 70 situated above the positioning table 61 to modify the position of an individual membrane sheet after the membrane sheet has been cut from the membrane web 32. In one configuration, the vision system 70 includes one or more cameras to detect the orientation of a membrane sheet cut from the membrane web 32. In a preferred embodiment, two such cameras are employed in the vision system 70.

According to another configuration, the vision system 70 comprises a vision processor that determines the orientation of a cut membrane sheet with respect to x-, y-, and z-axes using image data produced by one or more cameras. The vision processor is communicatively coupled to the controller 90 of the web converting apparatus 30. In this configuration, the camera(s) of the vision system 70, vision processor, and controller 90 of the web converting apparatus 30 cooperate to control movement of the positioning table 61 so that a membrane sheet cut from the membrane web 32 is moved precisely to the desired orientation.

The web converting apparatus 30 further includes a robot 40. The robot 40 is controllably moveable between at least the staging station 50 and the positioning station 60 via transport frame 44, and is preferably capable of moving on the transport frame 44 to processing locations beyond the positioning station 60. The robot 40, according to one configuration, is a three axis (x, y, z) servo and pneumatic driven mechanism that is controlled to pull the membrane web 32 to the staging station 50 and positioning station 60, and transfer individual membrane sheets from the positioning station 60 to a downstream process location. The precise orientation of the individual membrane sheet moved into proper position by the positioning table 60 is maintained as the robot 40 transports individual membrane sheets from the positioning station 60 to the downstream process location.

The robot 40 is mounted for movement with multiple degrees of freedom, and includes a pickup head which comprises a vacuum chuck 42. The vacuum chuck 42 of the robot 40 can be moved axially with respect to an x-axis and a y-axis, and a z-axis. Movement of the robot 40 is controlled by the controller 90. In one configuration, a servomotor drive system is employed for moving the vacuum chuck 42 of the robot 40 axially with respect to x-, y-, and z-axes. In accordance with another configuration, a pneumatic motor or motivator of the robot's drive system is employed to move the vacuum chuck 42 of the robot 40 axially with respect to the y-axis. A first servomotor of the robot's drive system is employed to move the vacuum chuck 42 of the robot 40 axially with respect to the x-axis. A second servomotor of the robot's drive system is employed to move the vacuum chuck 42 of the robot 40 axially with respect to the z-axis.

The web converting apparatus 30 can further include an inspection device 72 for inspecting the membrane web 32 in order to detect defects in the membrane patterns 33. The inspection device 72 is preferably an optical inspection device. In one configuration, an inspection camera 72 is employed for inspecting the membrane web 32 to detect completeness of the catalyst patterns 33 of the web 32.

An inspection device 72 of the web converting apparatus 30 can also include a device for inspecting one or both of a size and a quality of the catalyst patterns 33 of the web 32. For example, an inspection camera can be employed for inspecting one or both of a size and a quality of the catalyst patterns 33 of the web 32.

With continued reference to FIG. 2, and with reference to FIGS. 3–6, additional features of web converting according to an embodiment of the present invention will now be described. As was discussed above, and in accordance with one processing embodiment, the controller 90 is programmed to coordinate control of various web converting apparatuses as part of an automated fuel cell assembly operation. The controller 90 is programmed to cause the robot 40 to transport, with use of a vacuum produced at the vacuum chuck 42, an end portion of the membrane web 32 from the staging station 50 to the positioning table 61. The controller 90 selectively actuates and deactivates the first and second vacuums 52, 62 and the vacuum chuck vacuum when causing the cutter 73 to cut the membrane web 32 within the gap 34 between catalyst patterns 33. The controller 90 also controls movement of the positioning table 61 so that the membrane sheet cut from the membrane web 32 is moved to a desired orientation to facilitate subsequent processing of the membrane sheet. The controller 90 is programmed to automatically convert the membrane web 32 to separate membrane sheets on a repetitive basis.

According to another process embodiment, the controller 90 is programmed to coordinate a number of automated processes for converting a web of a fuel cell membrane to individual membrane sheets, including the following processes. With use of the vacuum chuck 42 of the robot 40, the end portion of the membrane web 32 is pulled to the staging station 50. With use of the first vacuum 52, the end portion of the membrane web 32 is secured at the staging station 50. When moving the membrane web 32 from the staging station 50 to the second station 60, the vacuum chuck 42 is activated to hold the membrane web 32 and the first vacuum 52 is deactivated. With use of the vacuum chuck 42, an end portion of the membrane web 32 is transported from the staging station 50 to the positioning station 60, such that at least one membrane pattern 33 resides on the positioning table 61.

Figure 4:
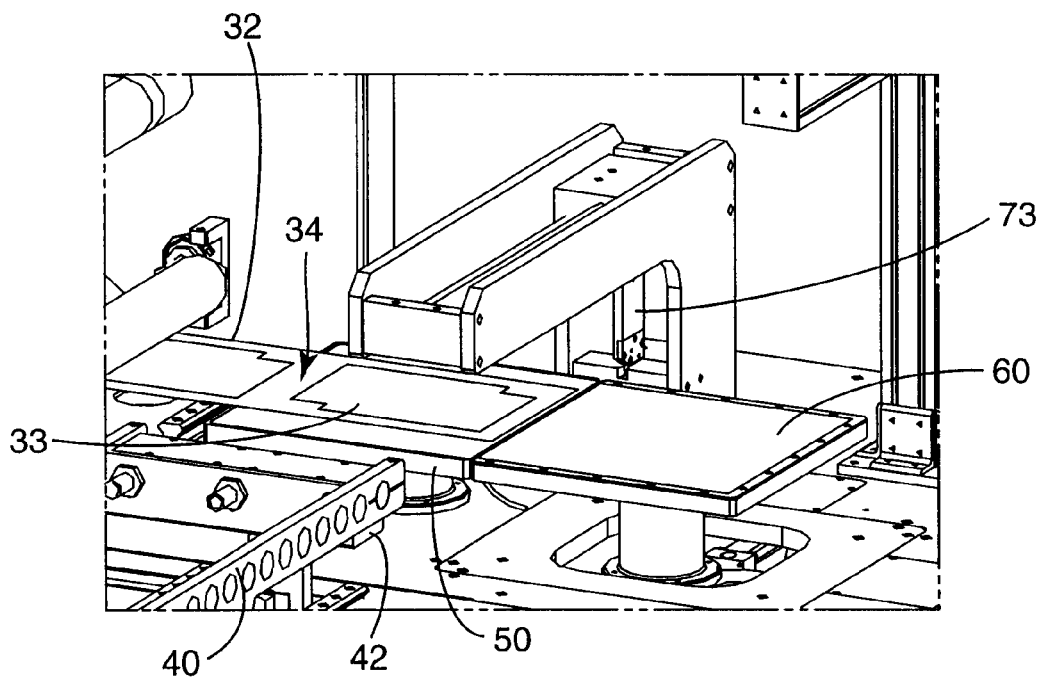
FIG. 4 illustrates a section of the apparatus in FIG. 3 that transports a web of a fuel cell membrane to a staging station in accordance with an embodiment of the present invention.
Figure 5:
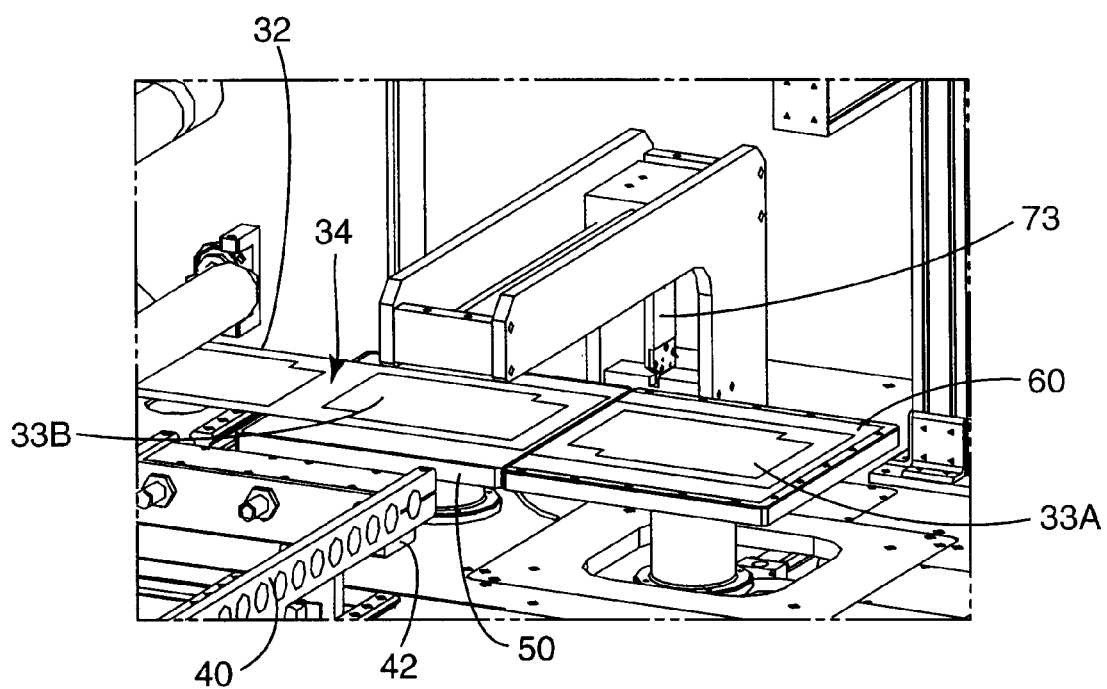
FIG. 5 illustrates a section of the apparatus in FIG. 3 that produces fuel cell membrane sheets from a web of a fuel cell membrane in accordance with an embodiment of the present invention.
Figure 6:
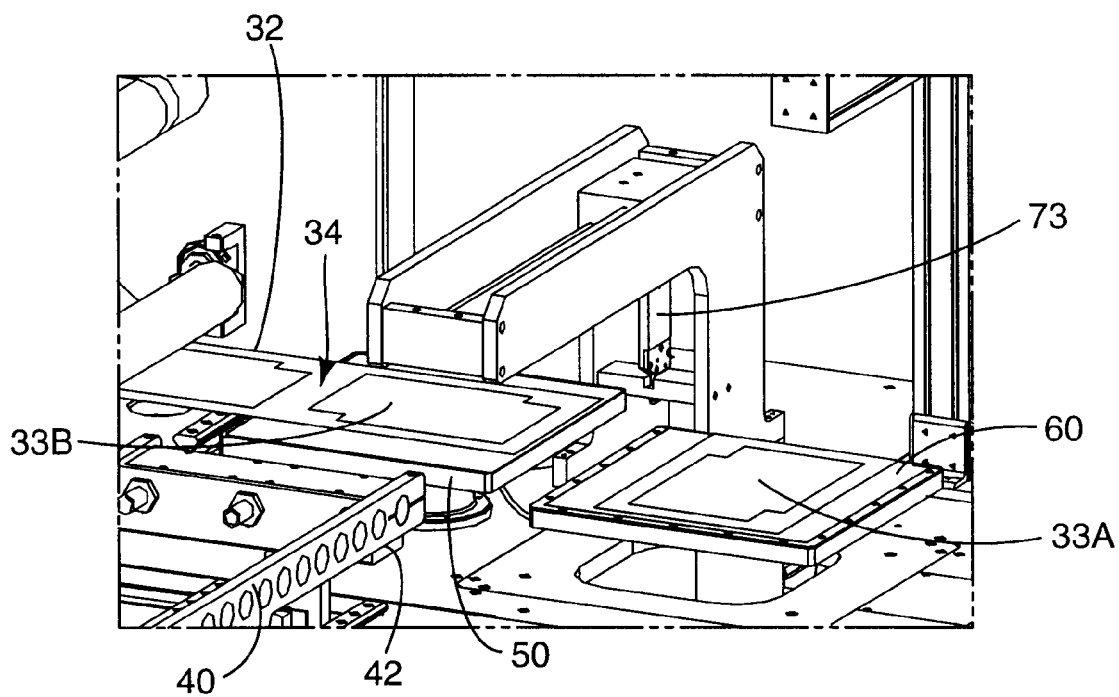
FIG. 6 illustrates a section of the apparatus in FIG. 3 that precisely positions individual fuel cell membrane sheets for subsequent processing in accordance with an embodiment of the present invention.

As best seen in FIGS. 4–6, with use of respective first and second vacuums 52, 62 at the staging station 50 and positioning station 60, and after removal of vacuum at the vacuum chuck 42, the end portion of the membrane web 32 is secured at the staging and positional stations 50, 60. While so secured, the membrane web 32 is cut by use of the cutter 73 within a gap 34 defined between a single catalyst pattern 33A of the membrane web end portion and an adjacent catalyst pattern 33B to produce a membrane sheet 33A. The membrane sheet 33A is positioned to a desired orientation to facilitate subsequent processing of the membrane sheet 33A.

As the catalyst pattern 33 passes under a photo-eye 74, the position of the catalyst pattern 33 is determined by the controller 90, which controls the x-axial movement of the robot 40 to continue until one complete catalyst pattern 33 has been fed to a position above the positioning table 61. The robot 40 then moves downward, such that the membrane web 32 is in close proximity, if not in contact, with the positioning table 61. The vacuum at the vacuum chuck 42 is deactivated while the first and second vacuums 52, 62, are activated, thus securing the membrane web 32 to the staging and positioning stations 50, 60. The robot 40 then retracts, leaving the leading catalyst pattern 33A on the positioning table 61.

With the membrane web 32 secured to the staging and positioning stations 50, 60, the controller 90 causes the cutter 73 to cut the membrane web 32 within the gap 34 between the leading catalyst pattern 33A and the adjacent catalyst pattern 33B. After completion of the cutting cycle, a single separated catalyst pattern 33A is secured via vacuum to the positioning table 61. The remaining portion of the membrane web 32 is left with the new leading catalyst pattern 33B in the "ready position" held under vacuum at the staging station 50.

The controller 90, vision system 70, and positioning table drive system 64 cooperate to move the positioning table 61 to a predetermined position, as is best seen in FIG. 5. At this stage, the separate catalyst sheet 33A is accurately positioned for processing at a subsequent processing station. The robot 40 moves into position above the separate catalyst sheet 33A (now repositioned to its predetermined orientation), grasps the separate catalyst sheet 33A via the vacuum chuck 42, and moves the separate catalyst sheet 33A to a subsequent processing station, all the while maintaining the predetermined orientation of the separate catalyst sheet 33A.

It is possible that the membrane web 32 may include flawed areas where the catalyst is not properly applied or where there exists some other defect on the membrane web 32. Photo-eye 74, preferably mounted above the staging station 50, may be used to detect defects within its field of view. The reject material is cut from the membrane web 32 and fed downstream to a waste receptacle. It is noted that a third inspection device 72, such as an optical device such as a camera, can be properly positioned to inspect the catalyst patterns 33 for size and quality. The controller or separate processing device executes image inspection algorithms to determine if the catalyst patterns 33 satisfy predetermined size and quality requirements. Rejects from this inspection can be discarded as discussed above.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for automatically converting a web of a thin patterned catalyst-coated membrane to separate membrane sheets for fuel cell assembly, a first side of the membrane web coated with an anode catalyst and a second side of the membrane web coated with a cathode catalyst, a web handling module presenting an end portion of the membrane web, the apparatus comprising:
   a staging station comprising a first vacuum and a gap detector, the gap detector detecting a gap between catalyst patterns of the membrane web, the staging station receiving the end portion of the membrane web;
   a positioning station comprising a positioning table and a second vacuum, the positioning table controllable to move axially and rotationally;
   a cutter;
   a vision system provided at the positioning station, the vision system detecting an orientation of a membrane sheet cut from the membrane web;
   a robot comprising a vacuum chuck, the robot moveable between at least the staging station and the positioning station; and
   a controller, the controller programmed to cause the robot to transport, with use of a vacuum at the vacuum chuck, the end portion of the membrane web from the staging station to the positioning table, to selectively actuate and deactivate the first and second vacuums and the vacuum chuck vacuum when causing the cutter to cut the membrane web within the gap between catalyst patterns, and to control movement of the positioning table so that the membrane sheet is moved to a desired orientation to facilitate subsequent processing of the membrane sheet.

2. The apparatus of claim 1, wherein the membrane is less than about two thousandths of an inch in thickness.

3. The apparatus of claim 1, wherein the controller is programmed to automatically convert the membrane web to a plurality of the separate membrane sheets.

4. The apparatus of claim 1, wherein the controller actuates the first vacuum to secure the end portion of the membrane web at the staging station, causes the robot to move to the staging station, and actuates the vacuum chuck and deactivates the first vacuum to facilitate transport of the end portion of the membrane web from the staging station to the positioning table by use the vacuum chuck.

5. The apparatus of claim 1, wherein the controller, in response to the gap detector detecting advancement of a single catalyst pattern of the membrane web to the positioning table, actuating the first and second vacuums and deactivating the vacuum chuck vacuum to stabilize the membrane web and causing the cutter to cut the membrane web within the gap between the single catalyst pattern and an adjacent catalyst pattern to produce a membrane sheet.

6. The apparatus of claim 1, wherein the gap detector comprises an optical detector that optically detects advancement of a single catalyst pattern of the membrane web to the second location.

7. The apparatus of claim 1, wherein the gap detector comprises a photo-eye that detects advancement of a single catalyst pattern of the membrane web to the second location.

8. The apparatus of claim 1, wherein the vision system comprises one or more cameras.

9. The apparatus of claim 1, wherein the vision system comprises a processor that determines axial orientation of the membrane sheet with respect to an x-axis, y-axis, and z-axis, the processor communicatively coupled to the controller to control movement of the positioning table so that the membrane sheet is moved to the desired orientation.

10. The apparatus of claim 1, wherein the robot comprises a servomotor drive system for moving the robot axially with respect to an x-axis, y-axis, and z-axis.

11. The apparatus of claim 1, wherein the robot comprises at least one pneumatic motivator for moving the robot axially with respect to one of an x-axis, y-axis, and z-axis.

12. The apparatus of claim 1, wherein the robot comprises:
   a first servomotor for moving the robot axially with respect to an x-axis;
   a second servomotor for moving the robot axially with respect to a z-axis; and
   a pneumatic motivator for moving the robot axially with respect to a y-axis.

13. The apparatus of claim 1, wherein the staging station is stationary.

14. The apparatus of claim 1, wherein the positioning system comprises a servomotor drive system for moving the positioning table axially with respect to an x-axis and y-axis, and rotationally about a z-axis.

15. The apparatus of claim 1, further comprising an optical detector for inspecting the membrane web to detect completeness of the catalyst patterns.

16. The apparatus of claim 1, further comprising an inspection camera for inspecting the membrane web to detect completeness of the catalyst patterns.

17. The apparatus of claim 1, further comprising an optical detector for inspecting one or both of a size and a quality of the catalyst patterns.

18. The apparatus of claim 1, further comprising an inspection camera for inspecting one or both of a size and a quality of the catalyst patterns.

* * * * *